US006877068B2

(12) United States Patent
Blanchard

(10) Patent No.: US 6,877,068 B2
(45) Date of Patent: Apr. 5, 2005

(54) METHOD AND DEVICE FOR PREFETCHING A REFERENCED RESOURCE

(75) Inventor: Simon Blanchard, Shanghai (CN)

(73) Assignee: Koninklijke Philips Electronics N.V., Eindhoven (NL)

(*) Notice: Subject to any disclaimer, the term of this patent is extended or adjusted under 35 U.S.C. 154(b) by 157 days.

(21) Appl. No.: 10/082,872

(22) Filed: Oct. 19, 2001

(65) Prior Publication Data

US 2002/0169828 A1 Nov. 14, 2002

(30) Foreign Application Priority Data

Oct. 24, 2000 (EP) .............................. 00203686

(51) Int. Cl.⁷ .............................................. G06F 12/00
(52) U.S. Cl. .................................... 711/137; 712/207
(58) Field of Search ............................ 711/137, 118; 712/207; 709/203, 217, 232, 229, 224, 223

(56) References Cited

U.S. PATENT DOCUMENTS

| 5,878,223 A | * | 3/1999 | Becker et al. ............ 709/223 |
| 6,055,572 A | * | 4/2000 | Saksena ................... 709/224 |
| 6,098,064 A |   | 8/2000 | Pirolli et al. ............. 707/2 |
| 2002/0194434 A1 | * | 12/2002 | Kurasugi ............... 711/137 |

FOREIGN PATENT DOCUMENTS

WO    WO9936868    7/1999    ........... G06F/17/30

OTHER PUBLICATIONS

Horng et al: "Hybrid prefetching for WWW proxy servers" Parallel And Distributed Systems, 1998. Proceedings. 1998 International Conference, Dec. 14, 1998, pp. 541–548.
Jiang et al: "Prefetching links on the WWW" Communications, 1997. ICC '97 Montreal, Towards The Knowledge Millennium. 1997 IEEE International Conference, Jun. 8, 1997, pp. 483–789.

* cited by examiner

*Primary Examiner*—Kimberly McLean-Mayo
(74) *Attorney, Agent, or Firm*—Michael E. Belk

(57) ABSTRACT

Disclosed are a method and device (100) for prefetching referenced resources (105) from servers (102, 103, 104). A first resource (106) is scanned for unfetched references (107), which are weighted and prefetched in the order of their weight. The computation of the weight is based on the number of times the resource referenced by the reference has been fetched previously, and on the number of times one or more further resources have been fetched previously from a server that serves the resource referenced by the reference. The device (100) can be realized as a computer program product.

19 Claims, 1 Drawing Sheet

Figures 1, 2:
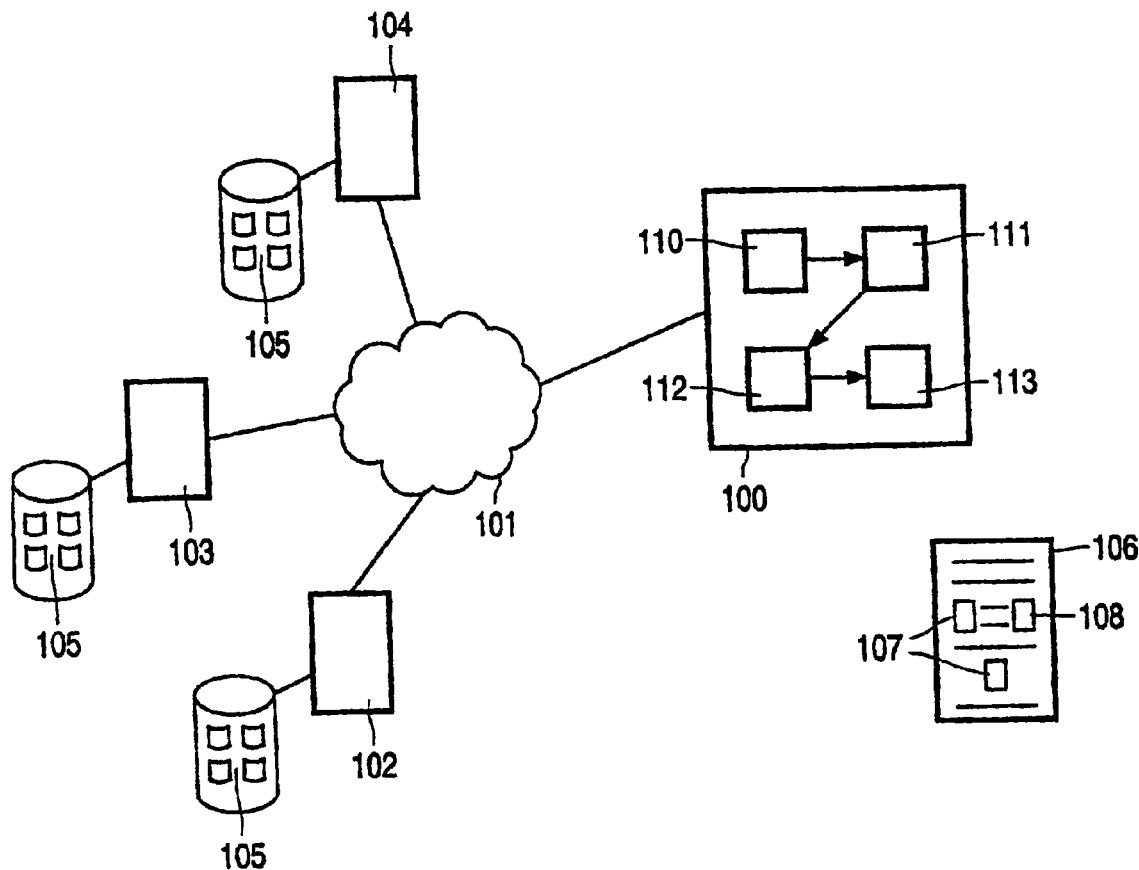

| http:// metalab. unc. edu / Dave / | 15 | 38 |
| http:// metalab. unc. edu / | 12 | 38 |
| ⋮ | ⋮ | ⋮ |

201  202  203

200

METHOD AND DEVICE FOR PREFETCHING A REFERENCED RESOURCE

The invention relates to a method of prefetching a referenced resource, comprising the steps of:
determining a group of references to resources from a given first resource,
for each reference to a resource in the group, computing a respective weight and assigning it to the reference,
determining a reference from the group having a maximal respective weight, and
prefetching the resource referenced by that reference.

The invention further relates to a device arranged for prefetching a referenced resource, comprising
link determination means for determining a group of references to resources from a given first resource,
link weighting means for computing, for each reference to a resource in the group, a respective weight and assigning it to the reference,
choosing means for choosing from the group a first reference having a maximal respective weight, and
prefetching means for prefetching a resource referenced by that first reference.

The invention further relates to a computer program product.

A method and system according to the preamble are known from U.S. Pat. No. 6,098,064.

Information systems such as the World-Wide Web (WWW) comprise a number of resources, such as textual documents, graphics, audio and video files. Some of these resources comprise references to other resources, for example in the form of hyperlinks or URLs. Resources are made available by various servers. A user can access them by fetching the resources from these servers with his client system.

This fetching is typically done on an as-needed basis, i.e. a resource is fetched when the user requests it. Since fetching takes time, it is desirable to prefetch resources so that the user does not have to wait when he requests such a prefetched resource. Prefetching involves fetching the resource from a server and storing it on the client system automatically, preferably in a local cache from which it can be accessed without a delay.

However, because of network capacity constraints, it is often not feasible to prefetch all resources referenced in a given resource. It is therefore desired to predict which references the user is most likely to follow and to prefetch those references. To this end the above-mentioned U.S. patent provides a method which determines a need probability that comprises a history factor and a context factor. The context factor is approximated by first defining a context of the client system and then using the context to estimate the probability that a reference resource is relevant to the user. The need probability of the referenced resources are computed and prefetched in decreasing order of need probability. This probability is based on the number of days since the last time the referenced resource in question was accessed and the frequency of said access.

A disadvantage of the above method is that it requires keeping track of a large amount of historical and contextual information.

It is an object of the invention to provide a method according to the preamble, which provides an accurate prediction of a referenced resource to be prefetched and which requires little information to be kept.

This object is achieved in the invention in a method which is characterized in that the respective weight for a reference is computed based on the number of times the resource referenced by that reference has been fetched previously, and on the number of times one or more further resources have been fetched previously from a server that serves the resource referenced by the reference. The information used in this computation requires little storage and can be kept track of easily. Further, it is very likely that a resource that was accessed many times in the past will also be accessed again in the future, and other resources available from the same server as the first server are also likely to be accessed. Thus the method provides accurate prediction.

In an embodiment the method further comprises the step of prefetching further resources referenced by references from the group in the order of their respective weights. An advantage of this embodiment is that the weights provide an ideal ranking mechanism for determining the order in which the referenced resources should be prefetched.

In a further embodiment the computation of the respective weight is further based on one or more keywords from a description of the resource referenced by the reference. An advantage of this embodiment is that such keywords can be used to determine the topic of the resource, which can be correlated with the user's preferences to enhance the accuracy of the prediction.

It is a further object of the invention to provide a device according to the preamble, which is arranged to provide an accurate prediction of a referenced resource to be prefetched and which requires little information to be kept.

This object is achieved in the invention in a device which is characterized in that the link weighting means are arranged to compute the respective weight for a reference based on the number of times the resource referenced by that reference has been fetched previously, and on the number of times one or more further resources have been fetched previously from a server that serves the resource referenced by the reference.

In an embodiment the prefetching means are further arranged for prefetching further resources referenced by references from the group in the order of their respective weights.

In a further embodiment the link weighting means are further arranged to compute the respective weight further based on one or more keywords from a description of the resource referenced by the reference.

These and other aspects of the invention will be apparent from and elucidated with reference to the embodiments shown in the drawings, in which:

FIG. 1 schematically shows a device according to the invention in a communication network; and FIG. 2 shows an example table with information for use in the device according to the invention.

Throughout the figures, same reference numerals indicate similar or corresponding features. Some of the features indicated in the drawings are typically implemented in software, and as such represent software entities, such as software modules or objects.

FIG. 1 schematically shows a device 100 connected to a communication network 101. Also connected to the communication network 101 are servers 102, 103, 104 which are arranged to serve resources to the device 100. The communication network 101 preferably is the Internet, and in that case the device 100 will typically be a general purpose computer running a web browser program which can fetch Webpages, images, sounds, video and other resources from the servers 102, 103, 104 using a protocol such as HTTP.

The device 100 is arranged to fetch one or more resources 105 from the servers 102, 103, 104. It may store the fetched resources 105 in a local storage, such as a local cache, so that they can be rendered to a user more easily and more quickly. As will become apparent below, the device 100 is arranged to prefetch resources 105 so that the user does not have to wait when he requests a prefetched resource. Prefetching involves fetching the resource 105 from a server 102, 103, 104 and storing it on the device 100 automatically, preferably in a local cache from which it can be accessed without a delay.

The device 100 comprises link determination module 110, link weighting module 111, choosing module 112 and prefetching module 113. When the device has accessed a first resource 106, there typically are a number of references 107, 108 to other resources in that first resource 106. For instance, in the case of the World-Wide Web, the first resource can be an HTML document comprising hyperlinks to other HTML documents or to other resources.

The link determination module 110 determines a group of references 107 to resources from the first resource 106. It may group all the references 107, 108 in the first resource, but preferably only those references 107 that are not in the local storage are grouped. Since the group is intended for use in prefetching, it is desirable not to include those references 108 to resources that already have been fetched, since they do not need to be prefetched.

The link weighting module 111 computes a respective weight for each reference 107 in the group and assigns the computed weight to the reference. In accordance with the invention, the link weighting module 111 computes a respective weight for a reference based on the number of times a resource referenced by the reference has been fetched previously and on the number of times one or more further resources have been fetched previously from a server that is arranged to serve the resource referenced by the reference. If the resource has been fetched many times previously, then it should receive a high weight since it is apparently popular. Other resources available from the same server are also more likely to be popular, at least more popular than other resources on other servers. It is often the case that a user will want to read multiple documents on one topic that are available on one server. It then makes sense to prioritize other resources available from the server that also serves the first resource.

The link weighting module may optionally compute the weight further based on one or more keywords from a description of the resource referenced by the reference. This description may come from the reference itself. For instance, the anchor text associated with the hyperlink that forms the reference can be used as a description. In the case of HTML, the optional TITLE attribute for the anchor element that forms the reference can be used as a description.

In a preferred embodiment, the weight W is computed based on the following formula:

$$W = A \times NU_p + B \times NS_p + C \times \sum_{i=1}^{n} K_i.$$

In this formula, A, B and C are scaling factors. $NU_p$ is the number of times the resource referenced by the reference has been fetched previously, and $NS_p$ is the number of times one or more further resources have been fetched previously from a server that is arranged to serve the resource referenced by the reference. The keywords $K_i$ used in the description are ranked from 1 to n, and summed to a total.

The scaling factors A, B and C are preferably initialized with a default value when the user first uses the device 100, and are tuned over time as the accuracy of the prediction is measured. If it is found that the user is more likely to return to previously fetched resources, then the value of scaling factor A should be increased, for instance.

After the weights have been computed for the references 107 in the group, the weighted references are then sent to the choosing module 112, which chooses from the group a first reference having a maximal weight. The prefetching module 113 then prefetches a resource 105 referenced by that first reference. This resource resides on one of the servers 102, 103, 104 and is prefetched over the communication network 101. The prefetching module 113 may prefetch one or more further resources 105 referenced by references from the group in decreasing order of weight.

Since prefetching requires potentially valuable network capacity, it may be desirable to limit the number of resources or the amount of data that is prefetched. To this end, the prefetching module 113 could be provided with a maximum on the number of resources or the amount of data it may prefetch for a given first resource.

FIG. 2 shows a table 200 for use with the device 100. To obtain the values for the number of times a resource referenced by the reference has been fetched previously and on the number of times one or more further resources have been fetched previously from a server that is arranged to serve the resource referenced by the reference, the device 100 may comprise a memory which stores a table with these values. The table should be updated whenever a resource is accessed by the user. In the example embodiment of FIG. 2, the table 200 comprises a first column 201, a second column 202 and a third column 203. The first column 201 comprises reference to resources. The second column 202 comprises, for each reference in the first column 201, the number of times a resource referenced by the reference has been fetched previously. The third column 203 comprises, for each reference in the first column 201, the number of times one or more further resources have been fetched previously from a server that is arranged to serve the resource referenced by the reference. Whenever the device 100 fetches a resource for which no reference is in the table, a row for that reference should be created. When the reference is in the table, and the resource to which that reference references is fetched again, the values in the second column 202 and third column 203 for that reference is increased. When another reference is fetched from the same server, the value in the third column 203 is increased.

The device 100 can be realized as a computer program product which can be loaded into a general purpose programmable device, such as a personal computer, and which causes said programmable device to function as the device 100. This computer program product may preferably comprise a world-wide web browser or a caching proxy server. This computer program product may be offered for downloading by one of the servers 102, 103, and 104.

What is claimed is:

1. A method of prefetching a referenced resource, comprising the steps of:
   determining a group of references (107) to resources from a given first resource (106),
   for each reference (107) to a resource in the group, computing a respective weight and assigning it to the reference (107),
   determining a reference from the group having a maximal respective weight, and
   prefetching the resource referenced by that reference, wherein the respective weight for a reference (107) is computed based on the number of times (202) the resource referenced by that reference (107) has been fetched previously, and on the number of times (203) one or more further resources have been fetched previously from a server (102, 103, 104) that serves the resource referenced by the reference (107).

2. A method as claimed in claim 1, further comprising the step of prefetching further resources referenced by references (107) from the group in the order of their respective weights.

3. A method as claimed in claim 1, wherein the computation of the respective weight is further based on one or more keywords from a description of the resource referenced by the reference (107).

4. A device (100) for prefetching a referenced resource, comprising link determination means (110) for determining a group of references (107) to resources from a given first resource (106), link weighting means (111) for computing, for each reference (107) to a resource in the group, a respective weight and assigning it to the reference (107), choosing means (112) for choosing from the group a first reference having a maximal respective weight, and prefetching means (113) for prefetching a resource referenced by that first reference, wherein the link weighting means (111) are arranged to compute the respective weight for a reference (107) based on the number of times (202) the resource referenced by that reference (107) has been fetched previously, and on the number of times (203) one or more further resources have been fetched previously from a server (102, 103, 104) that serves the resource referenced by the reference (107).

5. A device (100) as claimed in claim 4, wherein the prefetching means (113) are further arranged for prefetching further resources referenced by references (107) from the group in the order of their respective weights.

6. A device (100) as claimed in claim 4, wherein the link weighting means (111) are further arranged to compute the respective weight further based on one or more keywords from a description of the resource referenced by the reference (107).

7. A computer program product enabling a programmable device when executing said computer program product to function as the device (100) of claim 4.

8. The computer program product of claim 7, comprising a world-wide web browser.

9. The computer program product of claim 7, comprising a caching proxy server.

10. A method of prefetching a referenced resource, comprising the steps of:

determining a group of references (107) to resources from a given first resource (106), determining a reference (107) from the group having a maximal respective weight wherein the respective weight for the reference (107) is computed based on the number of times (202) the resource (106) referenced by that reference (107) has been fetched previously, and on the number of times (203) one or more further resources have been fetched previously from a server (102, 103, 104) that serves the resource referenced by the reference (107), and prefetching the resource referenced by that reference.

11. A method as claimed in claim 10, further comprising the step of prefetching further resources referenced by references (107) from the group in the order of their respective weights.

12. A method as claimed in claim 10, wherein the computation of the respective weight is further based on one or more keywords from a description of the resource referenced by the reference (107).

13. A method as claimed in claim 10, further comprising the step of linking the group of references (107) to resources from the resource (106).

14. A method as claimed in claim 13, wherein the step of linking further comprises computing, for each reference (107) to resources in the group, a respective weight and assigning it to the reference (107).

15. A method as claimed in claim 14, wherein the step of linking further comprises choosing from the group a first reference having the maximal respective weight.

16. A method as claimed in claim 14, wherein choosing further comprises computing the respective weight based on one or more keywords from a description of the resource referenced by the reference (107).

17. A computer program product enabling a programmable device when executing the method of claim 10.

18. The computer program product of claim 17, comprising a world-wide web browser.

19. The computer program product of claim 17, comprising a caching proxy server.

* * * * *